United States Patent

(12) United States Patent
De Boer et al.

(10) Patent No.: US 10,232,516 B2
(45) Date of Patent: Mar. 19, 2019

(54) GRIPPER ASSEMBLY AND METHOD FOR GRIPPING A TIRE COMPONENT

(71) Applicant: VMI HOLLAND B.V., Epe (NL)

(72) Inventors: Anthonius Maria Hendrina De Boer, Epe (NL); Gerardus Johannes Catharina Van Laar, Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 15/558,531

(22) PCT Filed: Mar. 29, 2016

(86) PCT No.: PCT/NL2016/050212
§ 371 (c)(1),
(2) Date: Sep. 14, 2017

(87) PCT Pub. No.: WO2016/167644
PCT Pub. Date: Oct. 20, 2016

(65) Prior Publication Data
US 2018/0079087 A1  Mar. 22, 2018

(30) Foreign Application Priority Data
Apr. 14, 2015 (NL) ..................................... 2014635

(51) Int. Cl.
*B25J 15/06* (2006.01)
*B29D 30/00* (2006.01)
(Continued)

(52) U.S. Cl.
CPC ....... *B25J 15/0625* (2013.01); *B25J 15/0052* (2013.01); *B25J 15/0491* (2013.01); *B29D 30/0016* (2013.01); *B29D 2030/0038* (2013.01)

(58) Field of Classification Search
CPC ................ B25J 15/0625; B25J 15/0052; B25J 15/0491; B29D 30/0016
(Continued)

(56) References Cited

U.S. PATENT DOCUMENTS 4,839,117 A * 6/1989 Swenson ............... B29C 44/143
264/101
5,131,971 A 7/1992 Elia et al. ..................... 156/512
(Continued)

FOREIGN PATENT DOCUMENTS

JP   H05146983   6/1993   .............. B25J 15/06
JP   7-157117    6/1995
(Continued)

OTHER PUBLICATIONS

International Search Report and Written Opinion issued in application No. PCT/NL2016/050212, dated Aug. 31, 2016 (11 pgs).
(Continued)

Primary Examiner — Paul T Chin
(74) Attorney, Agent, or Firm — Hayes Soloway P.C.

(57) ABSTRACT

A gripper assembly has a gripper having a gripping element with a gripping face to engage and retain a tire component through suction. The gripping face has a plurality of sections; each section has a vacuum channel and a valve placed between the vacuum channel of the respective section and a vacuum source. Each valve is individually operable to an open position and a closed position, wherein the gripping face in use has a suction area formed by the sections of which the respective valves are in the open position, wherein the suction area is adjustable by selectively operating the plurality of valves to open positions and closed positions wherein the gripper assembly further has a configuration tool which is arranged to control the respective valves to their open and closed positions.

33 Claims, 11 Drawing Sheets

(51) Int. Cl.
*B25J 15/00* (2006.01)
*B25J 15/04* (2006.01)

(58) Field of Classification Search
USPC ............... 294/185, 187, 188, 65; 414/737
See application file for complete search history.

(56) References Cited

U.S. PATENT DOCUMENTS

| | | | | |
|---|---|---|---|---|
| 5,172,949 | A * | 12/1992 | Nagai | B65G 47/91 |
| | | | | 294/185 |
| 5,207,553 | A * | 5/1993 | Konagai | B25J 15/0616 |
| | | | | 294/65 |
| 5,414,955 | A * | 5/1995 | Morin | A01C 7/042 |
| | | | | 294/185 |
| 5,609,377 | A | 3/1997 | Tanaka | 294/65 |
| 6,341,808 | B1 * | 1/2002 | Baan | B25B 11/005 |
| | | | | 294/186 |
| 2003/0102682 | A1 * | 6/2003 | Kurokawa | H01L 21/6838 |
| | | | | 294/188 |
| 2004/0051323 | A1 * | 3/2004 | Stohr | B25J 9/1015 |
| | | | | 294/65 |
| 2004/0094979 | A1 | 5/2004 | Danhuis | 294/65 |
| 2008/0080962 | A1 | 4/2008 | Holtmeier | 414/627 |
| 2010/0068012 | A1 | 3/2010 | Petijean | 414/225.01 |
| 2012/0181804 | A1 * | 7/2012 | Schmidt | B65G 47/917 |
| | | | | 294/185 |
| 2013/0008138 | A1 * | 1/2013 | Subotincic | B25J 15/0052 |
| | | | | 53/473 |
| 2013/0082475 | A1 * | 4/2013 | Fukano | B65G 47/91 |
| | | | | 294/188 |
| 2013/0127194 | A1 * | 5/2013 | Regan | B25J 15/0675 |
| | | | | 294/188 |
| 2013/0129464 | A1 * | 5/2013 | Regan | B25J 15/0691 |
| | | | | 294/186 |
| 2014/0090528 | A1 * | 4/2014 | Graf | B29B 11/16 |
| | | | | 294/188 |
| 2014/0277721 | A1 | 9/2014 | Tomo et al. | 700/253 |
| 2015/0298316 | A1 * | 10/2015 | Accou | H05K 13/0408 |
| | | | | 414/752.1 |
| 2017/0152115 | A1 * | 6/2017 | Montoya | B65G 47/917 |
| 2018/0009111 | A1 * | 1/2018 | Ho | B25J 9/1687 |
| 2018/0029807 | A1 * | 2/2018 | Oono | B25J 15/0633 |

FOREIGN PATENT DOCUMENTS

| | | | |
|---|---|---|---|
| JP | 2011-241028 | 12/2011 | |
| JP | 2014-176926 | 9/2014 | |
| WO | WO2012172484 | 12/2012 | ............... B26D 7/32 |

OTHER PUBLICATIONS

Decision to Grant issued in corresponding Japanese Patent Application Serial No. 2017-500082, dated Mar. 6, 2018 with translation (6 pages).

* cited by examiner

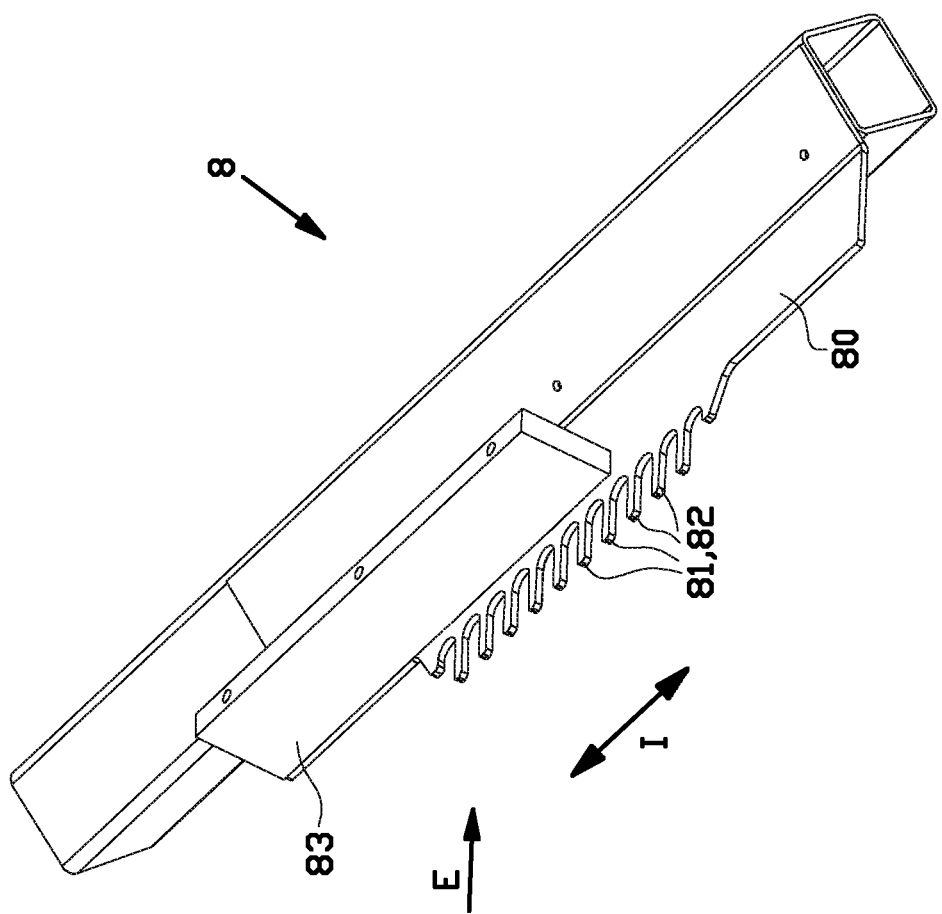

US 10,232,516 B2

GRIPPER ASSEMBLY AND METHOD FOR GRIPPING A TIRE COMPONENT

BACKGROUND

The invention relates to a Gripper assembly and a method for gripping a tire component, in particular a tire component for forming a body ply or a breaker ply.

Grippers for gripping tire components are known in different sizes and shapes and with different gripping techniques to optimally grip tire components of different sizes and shapes. In particular the length of subsequently handled tire components may vary considerably, for example when building two breaker plies out of alternatingly shorter and longer tire components. The known grippers have to be interchanged for each tire component that either has a different size or a different shape compared to the previously handled tire component. In particular for grippers operating with suction, it is important to ensure that the right gripper is selected for each tire component such that the area of the selected gripper sufficiently matches the tire component, otherwise air leakage will prevent the buildup of sufficient underpressure to retain the tire component. The interchanging of grippers is time consuming.

It is an object of the present invention to provide a gripper assembly and a method for gripping a tire component, wherein the flexibility of the gripper can be improved.

SUMMARY OF THE INVENTION

According to a first aspect, the invention provides a gripper assembly for gripping a tire component, in particular a tire component for forming a body ply or a breaker ply, wherein the gripper assembly is provided with a gripper comprising a gripping element with a gripping face that is arranged to engage and retain the tire component through suction, wherein the gripping face comprises a plurality of sections, wherein the gripper for each section comprises a vacuum channel that debouches at the respective section in the gripping face for retaining the tire component to the respective section and a valve that is placed between the vacuum channel of the respective section and a vacuum source, wherein each valve is individually operable to an open position in which the valve is arranged to connect the vacuum channel of the respective section in fluid communication to the vacuum source and a closed position in which the valve is arranged to disconnect the vacuum channel of the respective section from the vacuum source, wherein the gripping face in use has a suction area formed by the sections of which the respective valves are in the open position, wherein the suction area is adjustable by selectively operating the plurality of valves to the open positions and the closed positions, wherein the gripper assembly further comprises a configuration tool, wherein the gripper and the configuration tool are positionable with respect to each other in a configuration position for operating the valves, wherein the gripper for each valve is provided with an operational member that is operationally connected to the respective valve to operate the respective valve to the open position and the closed position, wherein the configuration tool is provided with a plurality of configuration members which in the configuration position are arranged to interact with the operational members to control the respective valves to their open positions and their closed positions.

Thus, the suction area of the gripper can be adjusted, within the boundaries of the gripping face, to match or substantially match the shape and/or size of the tire component, without having to interchange the gripper for another gripper. This can greatly improve the flexibility of the gripper. The configuration tool can quickly configure the gripper without human intervention. The configuration tool can further prevent that human operators have to enter the potentially hazardous area of the gripper assembly to control the valves manually.

In an embodiment each operational member is movable in a push direction and a pull direction opposite to the push direction to operate the respective valve to the open position and the closed position, wherein the configuration members are arranged to push and pull the operational members to control the respective valves to their open positions and their closed positions. Pushing and pulling are relatively simple operations, which can be easily performed by simple tools, such as the configuration tool.

In an embodiment each operational member comprises a stem that is operationally connected to the valve in the push direction and a knob that is fixedly attached to the stem in the pull direction, wherein the configuration members are fingers which are arranged to mesh with, interact with or engage the knobs of the operational members for moving said operational members in the push direction or the pull direction. The fingers can be easily maintained as they do not have moving parts. The fingers can furthermore be inserted into tight spaces, e.g. in a meshing interaction between the stems of adjacent operational members.

In an embodiment the operational members are spaced apart in or parallel to an index direction over a constant interval, wherein the configuration members are spaced apart over the same constant interval. The configuration members can thus mesh with the operational members at any interval along the index direction.

In an embodiment one of the gripper and the configuration tool is positionable with respect to the other of the gripper and the configuration tool in various index positions along the index direction, wherein the index positions are spaced apart at the same constant interval as the operational members and the configuration members, wherein the configuration members are arranged to mesh with, interact with or engage a different amount of the operational members for each index position along the index direction. Thus, by positioning the gripper and the configuration tool with respect to each other in a selected index position, different numbers of operational members can be engaged, allowing for the control of only a part of the plurality of valves, and thus allowing for the sections in only a part of the activatable area to be connected to the vacuum source to form the suction area or to be disconnected from the vacuum source to not form part of the suction area.

In an embodiment the configuration members, when meshing with, interacting with or engaging two or more of the operational members, are arranged for meshing with, interacting with or engaging a closed group of two or more adjacent operational members in or parallel to the index direction. Thus, a closed group of two or more adjacent sections can be either connected to or disconnected from the vacuum source.

In an embodiment the gripper assembly further comprises a manipulator, preferably in the form of a robot, that is coupled to the gripper for positioning the gripper with respect to the tire component. The manipulator can control the relative position of the gripper with respect to the tire component and/or the configuration tool.

In an embodiment the gripper comprises a valve block that is mounted to the gripping element and that holds the valves in fluid communication with the vacuum channels, wherein the gripper assembly comprises at least one alternative gripping element for engaging and retaining an alternative tire component of a different size and/or shape through suction, wherein the valve block is detachable from the gripping element and mountable to the at least one alternative gripping element. Thus, the gripping elements themselves can be designed to be less complex, to require less maintenance and/or to be lower in costs. The complex, high-maintenance and/or expensive part of the gripping elements can be attached to any of the gripping elements.

In an embodiment the gripper is provided with a coupling element that is fixedly attached to the valve block, wherein the manipulator is arranged to engage the gripper at the coupling element. The complex, high-maintenance and/or expensive part of the gripping elements can be retained on the manipulator for use in combination with another one of the gripping elements.

In an embodiment the configuration tool is arranged to be stationary, wherein the manipulator is arranged for moving the gripper into proximity of the stationary configuration tool, such that the configuration tool is in the configuration position with respect to the gripper, wherein the manipulator is further arranged for moving the gripper with respect to the stationary configuration tool such that the configuration members interact with the operational members to control the respective valves to their open positions and their closed positions. By holding the configuration tool stationary, the complexity of the configuration tool can be further reduced. The manipulator can simply move the gripper into and out of the configuration position.

In an embodiment the gripper assembly further comprises a blocking tool that is movable with respect to the operational members between a release position and a blocking position for allowing or blocking, respectively, movement of the operational members in the push direction and the pull direction. The blocking tool can reliably secure the operational members against movement in the push direction and the pull direction before and after the configuration has taken place, so ensure that the configuration does not accidentally change during the gripping of the tire component.

In an embodiment the operational members are movable in the push direction and the pull direction between a pushed down position and a pulled up position, respectively, which are spaced apart by an intermediate space, wherein the blocking tool comprises a plurality of blocking members which in the blocking position extend into the intermediate space between the respective pushed down positions and the respective pulled positions to block movement in the pull direction of any of the operational members which are in the pushed down position and to block movement in the push direction of any of the operational members which are in the pulled up position. The blocking tool can thus simultaneously block the operational members regardless of whether they are positioned in the pushed down position or the pulled up position.

In an embodiment the configuration tool is provided with a displacement member that is arranged to displace the blocking tool from the blocking position into the release position when the configuration tool is in the configuration position with respect to the gripper. The displacement member can automatically move the blocking tool into the release position so that in the configuration position, the operational members are automatically freely movable in the push direction and the pull direction.

In an embodiment the blocking tool is provided with an abutment member, wherein the displacement member is arranged to abut the blocking tool at the abutment member to displace the blocking tool through abutment. The abutment member can be arranged to abut the configuration tool at a position that does not hinder the operation of the configuration tool, the operational members and/or the blocking tool.

In an embodiment the gripper is provided with a biasing element for biasing the blocking tool into the blocking position, wherein the displacement member is arranged for displacing the blocking tool against the bias into the release position. Thus, the blocking tool will automatically return to the blocking position when the abutment between the blocking tool and the configuration tool in the configuration position is terminated.

In an embodiment the blocking tool is provided on the gripper and is movable with respect to the operational members between the release position and the blocking position. The blocking tool can thus be moved together with the gripper to ensure that the configuration remains fixed during the gripping of the tire component.

In an embodiment, the gripper assembly further comprises a proximity sensor for detecting the return of the blocking tool from the release position to the blocking position. If the blocking tool does not return to the blocking position, this can be indicative of one of the operational members not being fully moved into its pulled up position or the pushed down position. Appropriate action can be taken to correct this misplaced operational member prior to the gripping operation.

In an embodiment one of the sections is provided with a pressure sensor for detecting the pressure in said section. The pressure in said one section will drop to a partial vacuum when a tire component is present. This pressure drop can be detected by the pressure sensor and used as an indicator of the presence of a tire component at the gripping face.

In an embodiment the sections form an activatable area of the gripping face, wherein the suction area is adjustable to a full mode in which the suction area extends across the entire activatable area and a partial mode in which the suction area extends across only a part of the activatable area. Adjusting the suction area to only a part of the activatable area, in accordance with the surface area of the tire component to be gripped, can prevent air leakage at the sections which are not covered by the tire component during gripping.

In an embodiment each section is directly adjacent to another one of the sections so as to allow the formation of the suction area from a single chain of adjacent sections. The tire component can thus be securely, reliably and/or uniformly retained to the gripping face.

In an embodiment the suction area is adjustable to match or substantially match the surface area of the tire component to be gripped. The tire component can thus be optimally engaged by and retained to the gripping face.

In an embodiment the tire component has a parallelogram or rhomboid contour with two pairs of parallel sides, wherein the gripping face has a parallelogram or rhomboid contour with two pairs of parallel sides for retaining the tire component on the gripping face with each pair of parallel sides of the tire component extending parallel or substantially parallel to one of the pairs of the parallel sides of the gripping face. Thus, the gripping face can be optimized for gripping and retaining a tire component with a specific parallelogram or rhomboid shape. Although the contour is fixed, the suction area can still be adjusted within said contour, again improving the flexibility of the gripper.

In an embodiment the sections extend in a first direction parallel to one of the pairs of parallel sides of the gripping face. The sections can thus securely, reliably and/or uniformly retain to the tire component to the gripping face in the first direction across the gripping face.

In an embodiment the sections are adjacent to each other in a second direction parallel to the other of the pairs of parallel sides of the gripping face. The suction area can thus be adjusted by varying the number of activated adjacent sections in the second direction in accordance with the dimension of the tire component in said second direction.

In an embodiment the sections cover the entire or substantially the entire gripping face in the first direction.

In an embodiment the sections cover the entire or substantially the entire gripping face in the second direction. The sections can thus securely, reliably and/or uniformly retain to the tire component to the gripping face across the entire gripping face in the first direction.

According to a second aspect, the invention provides a method for gripping a tire component, in particular a tire component for forming a body ply or a breaker ply, with the aforementioned gripper, wherein the method comprises the step of adjusting the suction area by selectively operating the plurality of valves to the open positions and the closed positions.

Thus, the suction area of the gripper can be adjusted, within the boundaries of the gripping face, to match or substantially match the shape and/or size of the tire component, without having to interchange the gripper for another gripper. This can greatly improve the flexibility of the gripper.

In an embodiment the sections form an activatable area of the gripping face, wherein the method comprises the step of adjusting the suction area to a full mode in which the suction area extends across the entire activatable area and a partial mode in which the suction area only extends across only a part of the activatable area. Adjusting the suction area to only a part of the activatable area, in accordance with the surface area of the tire component to be gripped, can prevent air leakage at the sections which are not covered by the tire component during gripping.

In an embodiment the suction area is formed by a single chain of adjacent sections. The tire component can thus be securely, reliably and/or uniformly retained to the gripping face.

In an embodiment the suction area is adjusted to match or substantially match the surface area of the tire component to be gripped. The tire component can thus be optimally engaged by and retained to the gripping face.

In an embodiment the step of adjusting the suction area to a specific configuration comprises the configuration steps of simultaneously operating all of the valves to the open position or the closed position and subsequently simultaneously operating a selection of the valves to the open position or the closed position in accordance with the specific configuration of the suction area. In this manner, all valve positions are reset and/or known to the operator, and the configuration tool can be used to set only a group of valves to another position.

In an embodiment the valve for at least one of the sections is kept open to detect the presence or partial presence of a tire component at said one section through measuring the pressure in said one section. The pressure in said one section will drop to a partial vacuum when a tire component is present. Said pressure drop can be detected as an indication of the presence of the tire component at the gripper face.

In an embodiment the gripper comprises a valve block that is mounted to the gripping element and that holds the valves in fluid communication with the vacuum channels, wherein the gripper assembly comprises at least one alternative gripping element for engaging and retaining an alternative tire component of a different size and/or shape through suction, wherein the method comprises the step of detaching the valve block from the gripping element and mounting the valve block to the at least one alternative gripping element. Thus, the gripping elements themselves can be designed to be less complex, to require less maintenance and/or to be lower in costs. The complex, high-maintenance and/or expensive part of the gripping elements can be attached to any of the gripping elements.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIG. 6 shows an isometric view of the configuration tool according to FIG. 1;

DETAILED DESCRIPTION OF THE INVENTION

Figure 1:
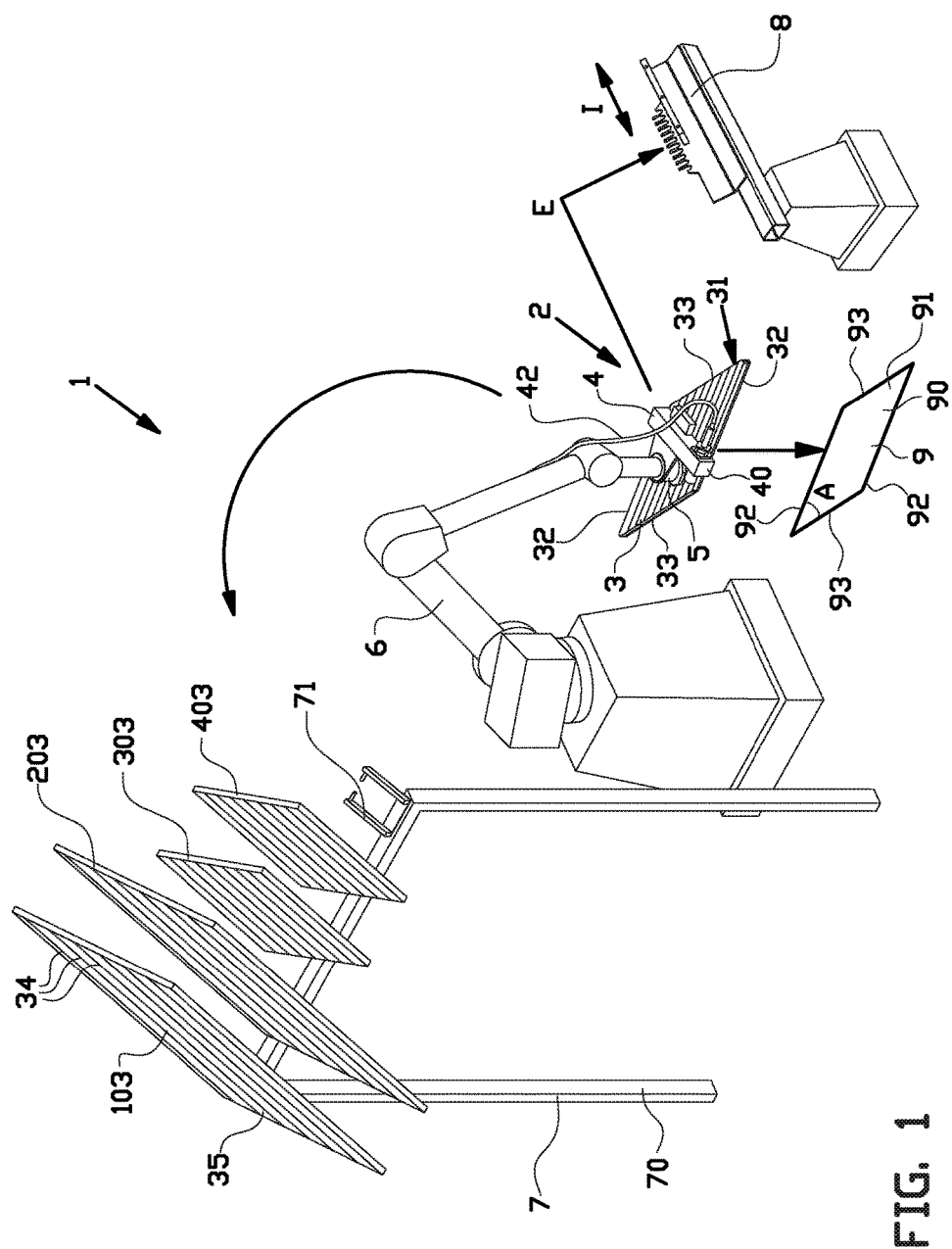
FIG. 1 shows an isometric view of a gripper assembly according to the invention, comprising a gripper and a configuration tool for configuring said gripper.

FIG. 1 shows a gripper assembly 1 according to the invention, for gripping a tire component 9, in particular a cord reinforced tire component 9 for forming a breaker ply or a body ply of a tire. Such tire components 9 are cut off from a continuous strip of cord-reinforced rubber material under a cutting angle or breaker angle to obtain a body of rubber material 90 with a characteristic parallelogram or rhomboid surface area 91 of the tire component 9, having a contour formed by a first pair 92 and a second pair 93 of parallel sides with oblique angles A between the directly adjacent sides.

As shown in FIG. 1, the gripper assembly 1 comprises a gripper 2 with a gripping element 3 for engaging and retaining the tire component 9 through suction, underpressure or a partial vacuum, a manifold block or vacuum block 4 for controlling the vacuum and a coupling element 5. The gripper assembly 1 is further provided with a manipulator 6 which is arranged to be coupled to the gripper 2 at the coupling element 5 for controlling the positioning of the gripper 2, for example for positioning the gripper 2 above the tire component 9 for gripping and/or for moving the gripper 2 between stations of a tire building machine (not shown) after gripping of the tire component 9 to transfer said tire component 9 between said stations. The gripper assembly 1 optionally comprises a storage rack or magazine 7 for holding a plurality of alternative gripping elements 103, 203, 303, 403 for gripping alternative tire components of different sizes and/or shapes (not shown). Finally, the gripper assembly 1 comprises a configuration tool 8 for configuring the gripper 2. The gripper assembly 1 according to the invention will be described in more detail hereafter.

As shown in FIGS. 2, 3, 4A and 4B, the gripping element 3 comprises a planar or plate-like body 30 having a parallelogram or rhomboid gripping face 31 with a contour formed by a first pair 32 and a second pair 33 of parallel sides. The first pair 32 of parallel sides defines a first direction B parallel to said first pair 32 of parallel sides. The second pair 33 of parallel sides defines a second direction C parallel to said first pair 32 of parallel sides. The adjacent sides of the pairs 32, 33 of parallel sides are placed under oblique angles A, equal or substantially equal to the oblique angles A between the pairs 92, 93 of parallel sides of the tire component 9. The gripping face 31 in use faces towards the body 90 of the tire component 9 and is aligned with each of its pairs 32, 33 of parallel sides aligned or parallel to a respective one of the pairs 92, 93 of parallel sides of the tire component 9. When fully aligned, the gripping element 3 is brought into contact with the tire component 9 and the gripping face 31 is arranged to engage and retain the surface area 91 of the tire component 9 through suction, underpressure or the partial vacuum.

Figure 4A:
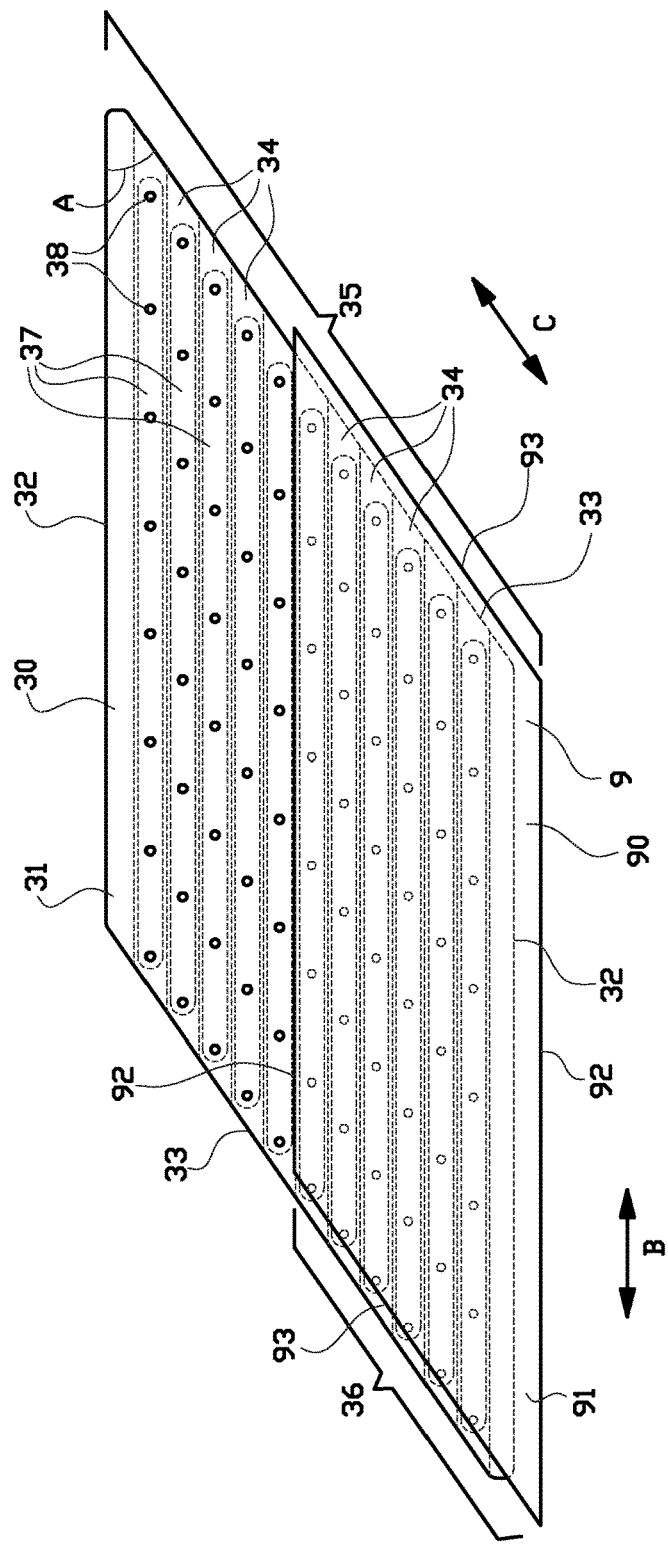
FIGS. 4A and 4B show a bottom view of the gripper according to FIG. 2.
Figure 4B:
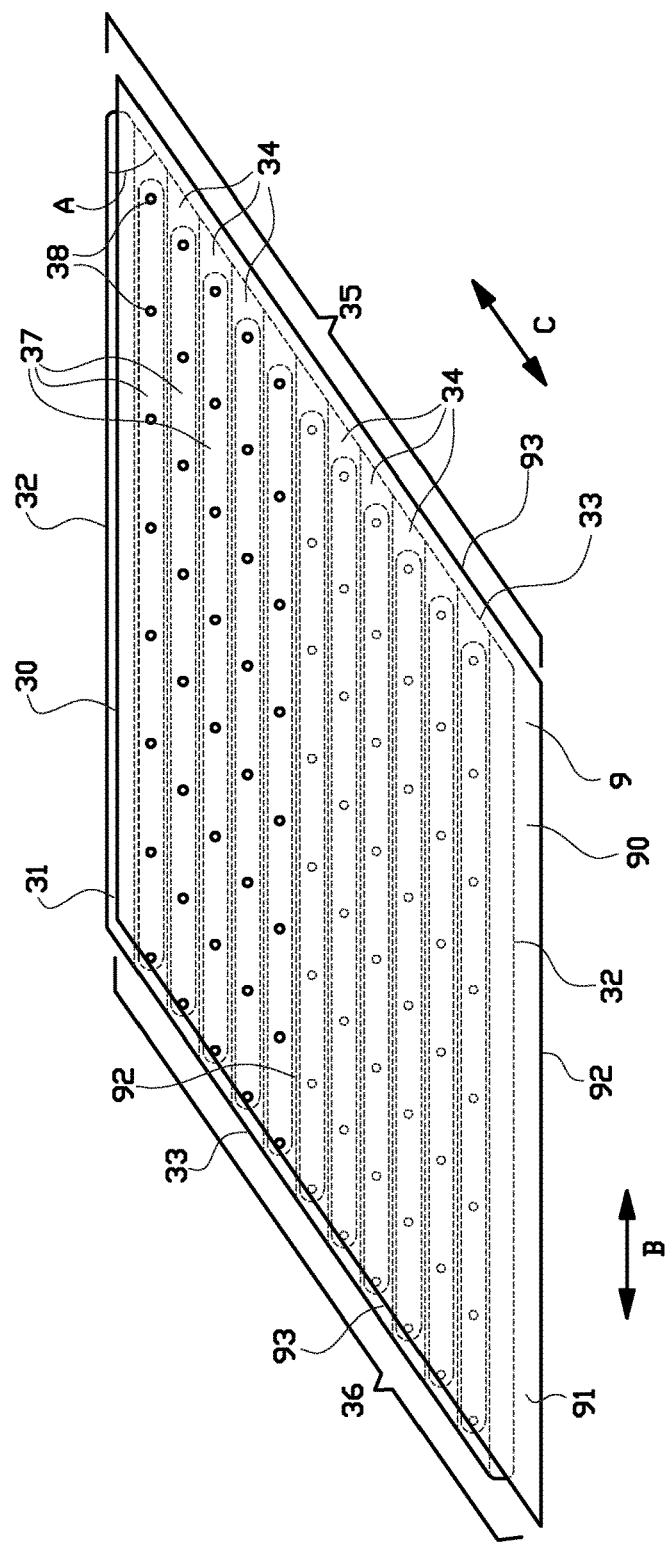

To obtain the partial vacuum, the gripping face 31 is divided into a plurality of sections 34 extending in the first direction B, parallel to the first pair 32 of parallel sides. The sections 34 are adjacent to each other in the second direction C parallel to the second pair 33 of parallel sides. The sections 34 can be individually activated to engage and retain a corresponding part of the surface area 91 of the tire component 9. The sections 34 form an activatable area 35 of the gripping face 31 that covers the entire or substantially the entire gripping face 31. The combination of sections 34 which are activated simultaneously form an activated area or a suction area 36 of the gripping face 31. In a full mode, as shown in FIG. 4B, all sections 34 are activated simultaneously, such that the suction area 36 extends across the entire activatable area 35. In a partial mode, as shown in FIG. 4A, only a group of sections 34 is activated so that the suction area 36 extends across only a part of the activatable area 35. Each section 34 is directly adjacent to another one of the sections 34 so as to allow the formation of a suction area 35 from a chain or a single chain of adjacent sections 34 and/or with a closed or single area within the activatable area 35.

Figure 5:
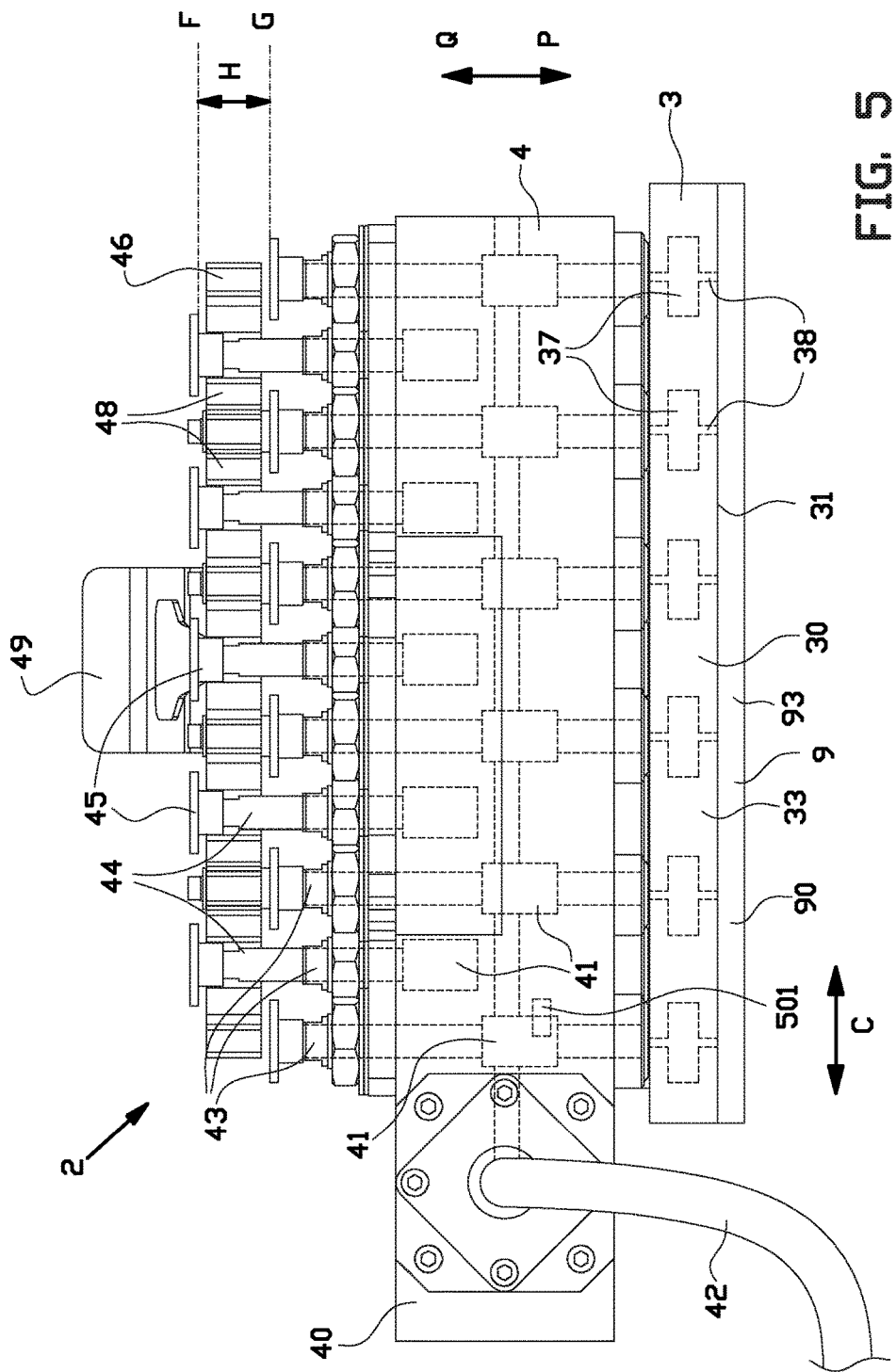
FIG. 5 shows a front view of the gripper according to FIG. 2.

As shown in FIGS. 4A, 4B and 5, for each section 34, the gripping element 3 is provided with a vacuum channel 37 that individually debouches into the respective section 34 via a plurality of suction holes 38. In this example, the vacuum channels 37 are integrated into the body 30 of the gripping element 3. The suction holes 38 are evenly distributed in the first direction B along the length of the respective section 34.

As shown in FIG. 5, the vacuum block 4 is detachably or removably mounted to the gripping element 3 at the side opposite to the gripping face 31. The vacuum block 4 is provided with a housing 40 and a plurality of valves 41 contained in said housing 40. The vacuum block 4 is operationally connected to a vacuum source (not shown) via a flexible hose or pipe 42. The vacuum block 4 can be operationally connected to and disconnected from the vacuum source by a main valve (not shown) to effectuate the retaining and release of the tire component 9 to and from the gripping face 31. When the vacuum block 4 is mounted to the gripping element 3, each valve 41 is aligned above and connected in sealed and/or fluid communication to a respective one of the vacuum channel 37. The valves 41 are placed between their respective vacuum channels 37 and the vacuum source. Thus, by selectively operating the valves 41, the vacuum channels 37 can be individually connected to and disconnected from the vacuum source and the sections 34 associated with each of the vacuum channels 37 can be individually and/or selectively activated.

Figure 2:
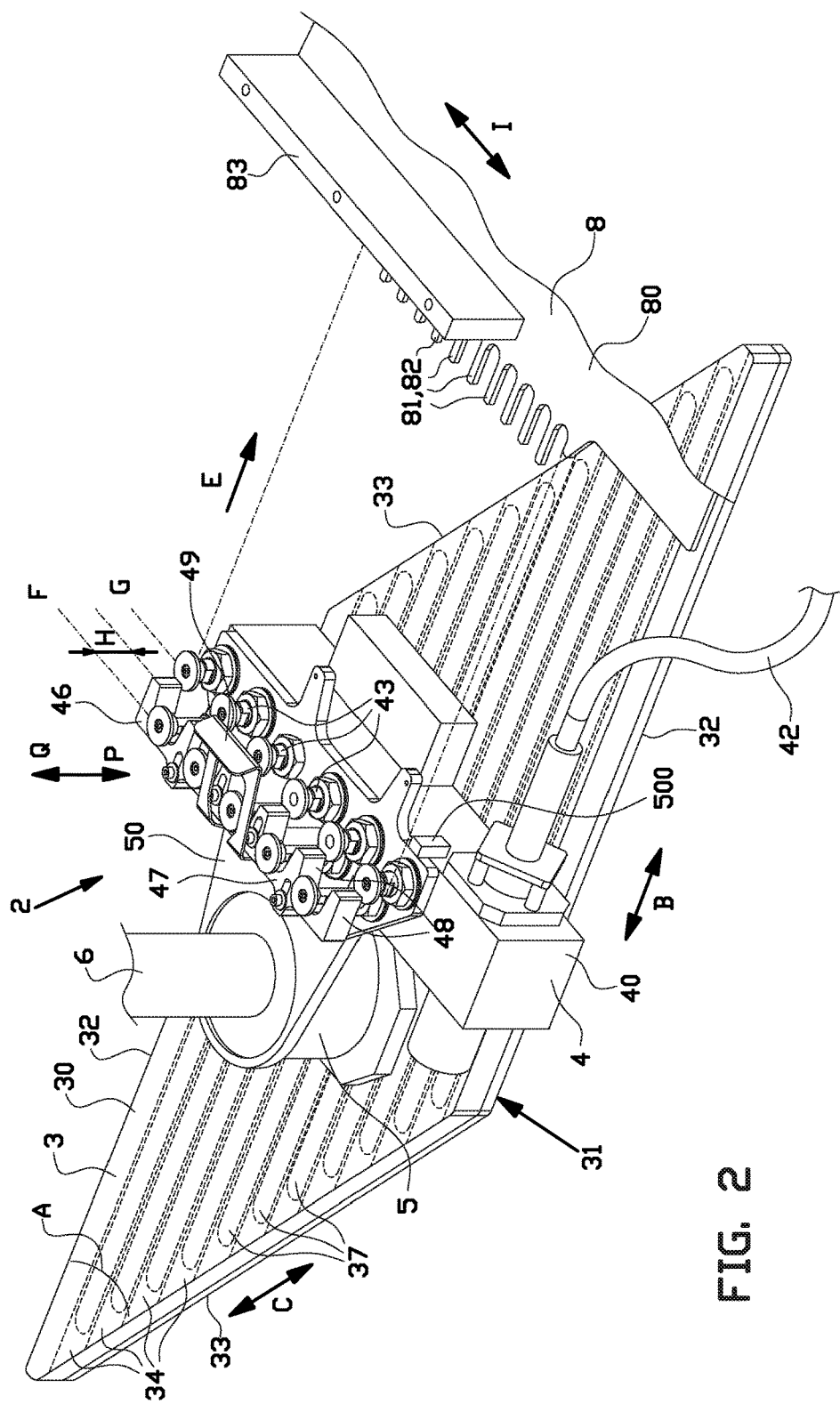
FIG. 2 shows an isometric view of gripper and the configuration tool of FIG. 1.

As best seen in FIG. 2, the gripper 2 for each valve 41 (as shown in FIG. 5) is provided with an operational member 43 that is operationally connected to the respective valve 41 and that is movable between a pulled up position F and a pushed down position G to switch or operate the respective valve 42 to or between an open position and a closed position, respectively. The valves 41 and their associated operational members 43 are spaced apart in or parallel to an index direction I over a constant interval. In FIG. 2, the operational members 43 are alternatingly placed in a first row in the pushed down position G and in a second row in the pulled up position F. Typically, before or during configuration of the gripper 2, all operational members 43 are either moved to the pulled up position F or the pushed down position G, after which the operational members 43 are selectively moved to the pulled up position F or the pushed down position G in accordance with a set configuration.

In this exemplary embodiment, the operational member 43 is movable in a push direction P and a pull direction Q opposite to the push direction P to operate the respective valve 41 (as shown in FIG. 5) to the open position and the closed position, respectively. The push direction P and the pull direction Q are orthogonal or perpendicular to the body 30 of the gripping element 3, wherein the operational members 43 are pushed towards the closed position F in the push direction P towards the gripping element 3 and pulled towards the open position E in the pull direction Q away from the gripping element 3. The operational member 43 comprises a stem 44 that is operationally connected to the valve 41 in the push direction P and a knob 45 that is fixedly attached to the stem 44 in the pull direction Q. The stem 44 is slidably received in the housing 40 of the vacuum block 4. The knobs are shaped to be easily engaged by the configuration member 8 in a manner that will be described hereafter.

Figure 3:
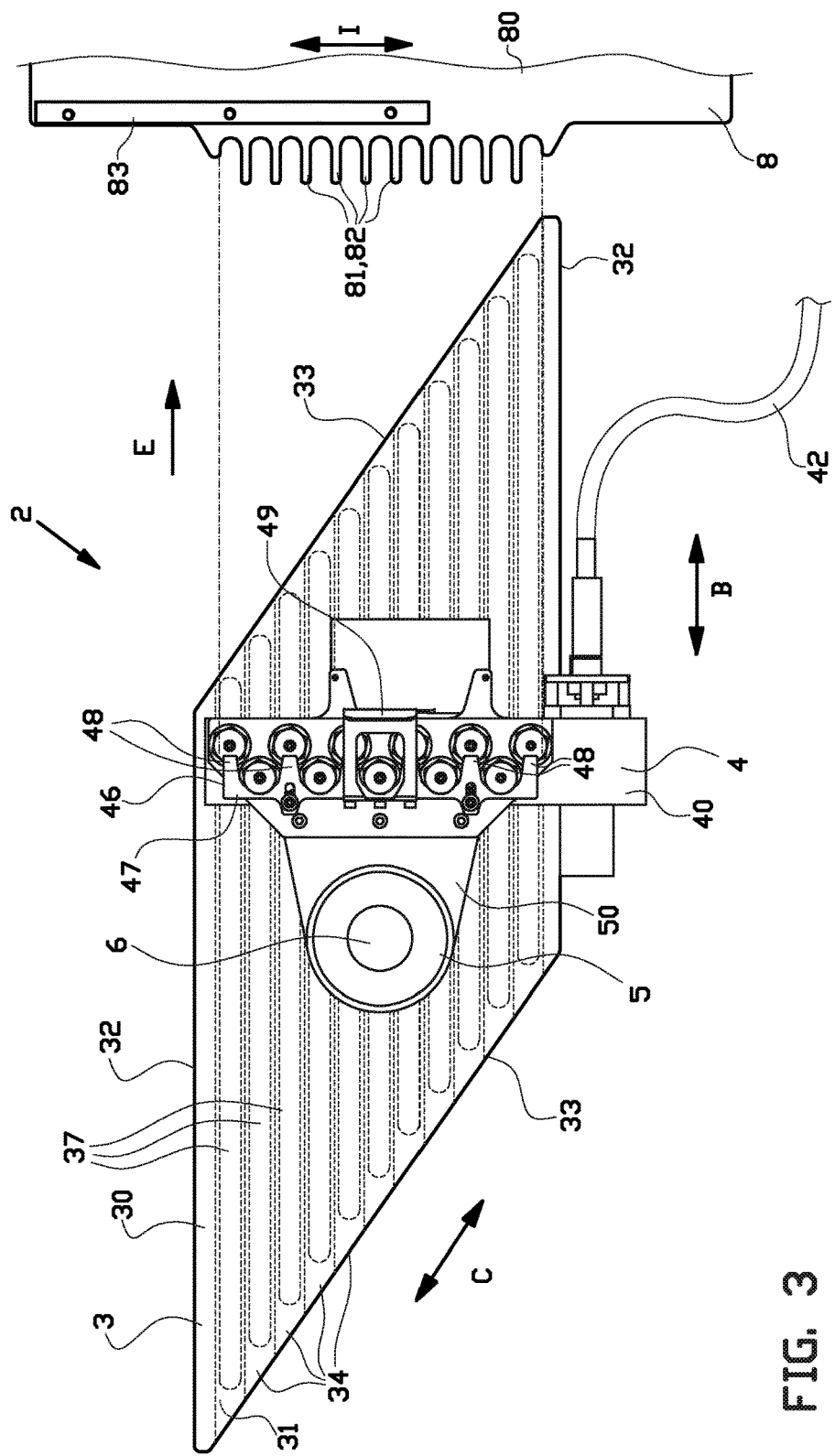
FIG. 3 shows a top view of the gripper and the configuration tool according to FIG. 2.
Figure 7A:
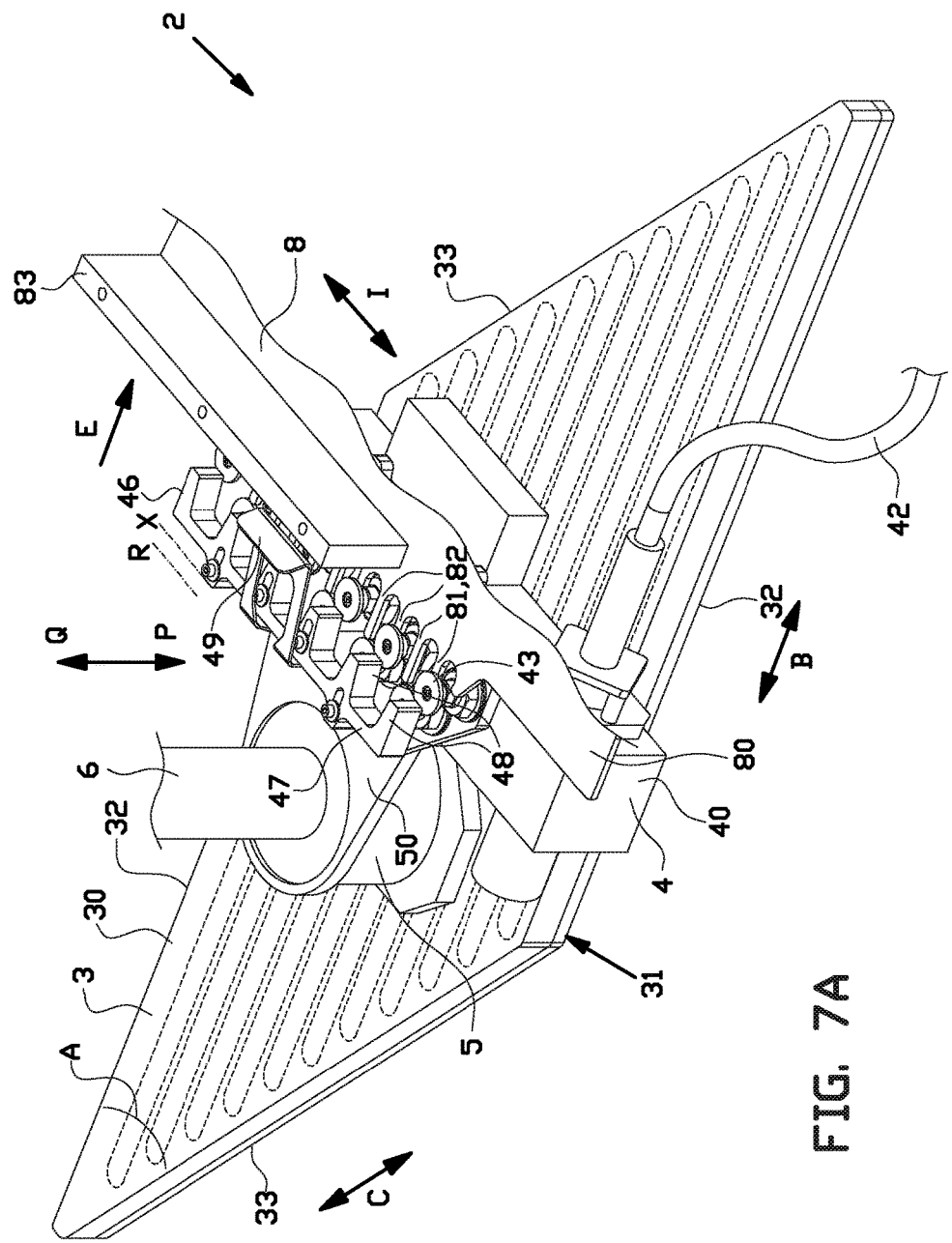
FIGS. 7A and 7B show isometric views of the steps of the gripper interacting with the configuration tool in a single configuration.
Figure 7B:
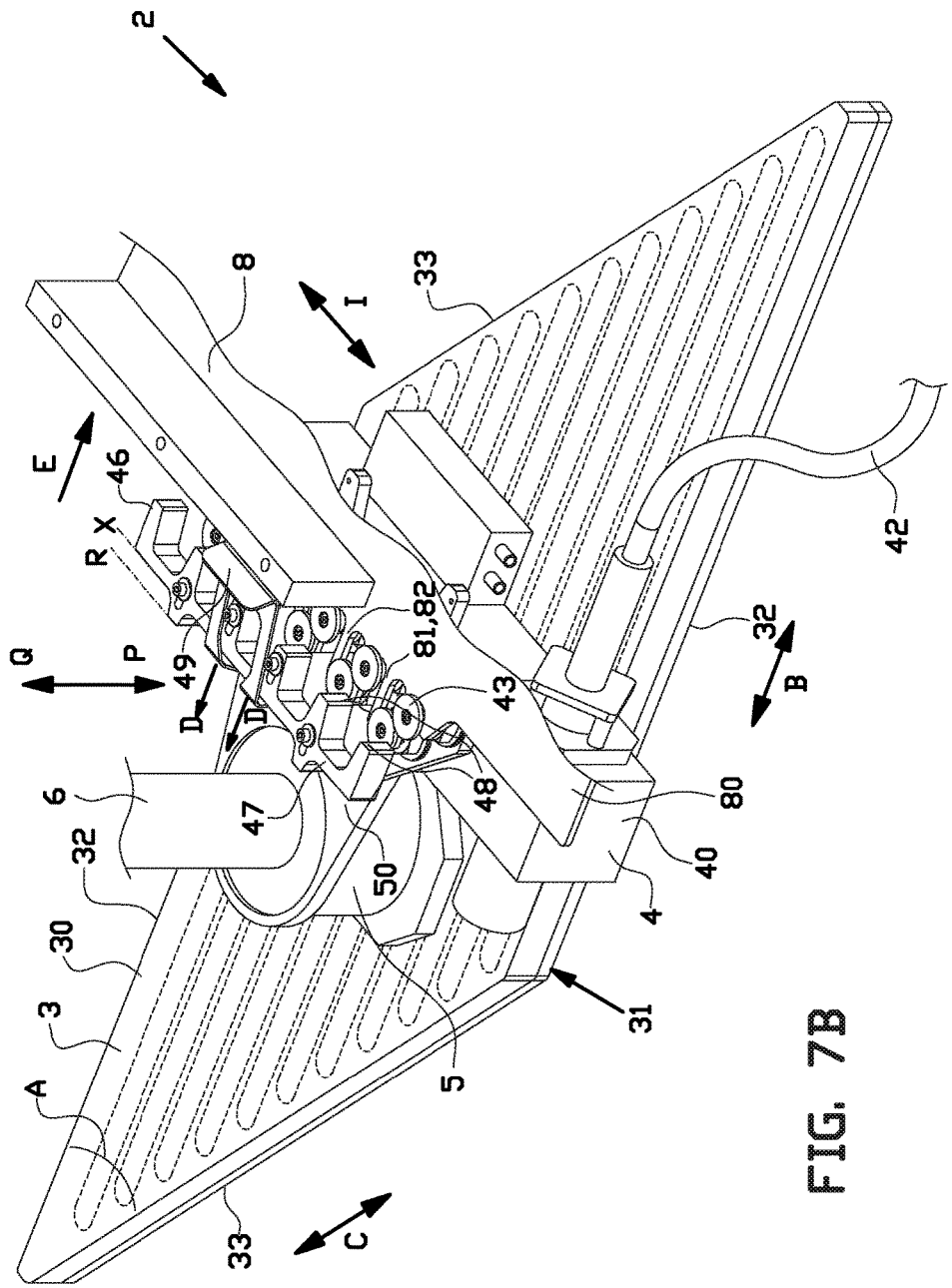

As shown in FIGS. 2, 3 and 5, the gripper 2 is provided with a blocking tool 46 that is movable with respect to the operational members 43 between a blocking position X, as shown in FIG. 7A, and a release position R, as shown in FIG. 7B, for blocking or allowing, respectively, movement of the operational members 43 in the push direction P and the pull direction Q. As best seen in FIG. 5, the operational members 43 in the pushed down position G and the pulled up position F are spaced apart by or moved through an intermediate space H.

The blocking tool 46 in the blocking position X extends into the intermediate space between the respective pushed down positions G and the respective pulled up positions F to block movement in the pull direction P of any of the operational members 43 which are in the pushed down position G and to block movement in the push direction P of any of the operational members 43 which are in the pulled up position F. Specifically, the blocking tool 46 is provided with a base 47 and a plurality of blocking members 48 extending from the base 47 and meshing between the operational members 43. The base 47 is arranged to move over or underneath the knobs 45 of the operational members 43 that are in the row closest to the base 47, while the distal ends of the blocking members 48 with respect to the base 47 are arranged to move over or underneath the knobs 45 of the operational members 43 in the row that is further away from the base 47. In this exemplary embodiment, the blocking tool 46 is slidably received on the vacuum block 4, e.g. in this case with the use of slots in the base 47 which are slidably with respect to bolts mounted in the vacuum block 4. The blocking tool 46 is further provided with an abutment member 49, e.g. in the form of a bracket, for moving or displacing the blocking tool 46 between the blocking position X and the release position R through abutment with an external tool, e.g. the configuration tool 8. The blocking tool 46 is biased to move into the blocking position X by one or more biasing elements, e.g. a spring (not shown).

As shown in FIG. 2, the gripper 2 is optionally provided with a proximity sensor 500 for detecting that the blocking tool 46 returns into the correct blocking position X. If the blocking tool 46 does not return to the blocking position X, this may be indicative of that one of the operational members 43 has not fully moved into its pulled up position F or the pushed down position G and is blocking the movement of the blocking tool 46 in the engagement direction E.

As shown in FIGS. 1 and 2, the manipulator 6 is arranged to engage the gripping element 3 at the coupling element 5, which in this example is detachably or removably mounted to the gripping element 3 together with or via the vacuum block 4. Preferably, the coupling element 5 is fixedly attached to the valve block 4, e.g. via the connection plate 50 as shown in FIG. 2. This allows for the easy removal of the valve block 4 and the coupling element 5 with the use of the manipulator 6 and the placement of said valve block 4 and the coupling element 5 on one of the alternative gripping elements 103, 203, 403 with the use of the manipulator 6.

As shown in FIG. 1, the manipulator 6 is arranged for engaging the gripper 2 at the coupling element 5 and for moving the gripping element 3 between a configuration position at or near the configuration tool 8, the magazine 7 for interchanging gripping elements 3, 103, 203, 303, 403 and one or more stations and/or a building drum of a tire building machine (not shown) for picking up, transferring and placing of the tire component 9 within said tire building machine. Preferably, the manipulator 6 is arranged for manipulating the position of the gripping element 3 in three dimensions and/or with respect to three Cartesian axes. Most preferably, the manipulator 6 is a robot, e.g. a robot with six degrees of freedom (6DoF).

The magazine 7 comprises a frame 70 with several mountings 71 for temporarily storing the gripping elements 3, 103, 203, 403 received from the manipulator 6. The alternative gripping elements 103, 203, 303, 403 are held by the frame 70 in an orientation such that the manipulator 6 can reach and engage each the alternative gripping elements 103, 203, 303, 403. The alternative gripping elements 103, 203, 303, 403 differ from the gripping element 3 as shown in FIG. 2 in size and/or the angle A between the adjacent sides. The number of vacuum channels and their mutual spacing in the alternative gripping elements 103, 203, 303, 403 is identical to the gripping element 3, thus allowing for the same vacuum block 4 to be universally attachable to each of the alternative gripping elements 103, 203, 303, 403 and to universally connect the valves 41 (as shown in FIG. 5) in sealed and/or fluid communication with the respective vacuum channels in the alternative gripping elements 103, 203, 303, 403. When interchanging one gripping element 3 for an alternative gripping element 103, 203, 303, 403, the coupling element 5 and the valve block 4 are detached from the gripping element 3 and are retained on the manipulator 6. Only the gripping element 3 is released and placed by the manipulator 6 on the mounting 71 at the frame 70. The coupling element 5 and valve block 4 are subsequently reattached to one of the alternative gripping elements 103, 203, 303, 403 which is then ready for operation.

The gripping element 3 and the alternative gripping elements 103, 203, 303, 403 are optionally provided with detectable tags, e.g. RFID tags, while the valve block and/or the manipulator 6 are provided with a detection means for detecting said tags. Thus, the gripping elements 3, 103, 203, 303, 403 can be recognized and the process can be adjusted accordingly to take into account the dimensions and/or angles of the selected gripping element 3, 103, 203, 303, 403.

As shown in FIG. 6, the configuration tool 8 comprises a base 80 and a plurality of configuration members 81 extending from said base 80 in an engagement direction E towards the operational members 43 when the gripper 2 is in the configuration position at or near the configuration tool 8. The configuration members 81 are arranged to interact with the operational members 43 to control the respective valves 41 (as shown in FIG. 5) to their open positions and their closed positions. In particular, the configuration members 81 are arranged to push and pull the operational members 43 in the push direction P and the pull direction Q, respectively, between the pushed down position G and the pulled up position F to control the respective valves 41 to their open positions and their closed positions, respectively. In this exemplary embodiment, the configuration members 81 are fingers 82 which are arranged to mesh with, interact with or engage the knobs 45 of the operational members 43 for moving said operational members in the push direction P or the pull direction Q. The fingers 82 are spaced apart over the same constant interval as the operational members 43 in the index direction I. The configuration tool 8 is provided with a displacement member 83 standing up from the base 80. The displacement member 83 is arranged to abut the abutment member 49 of the blocking tool 46 in the engagement direction E to displace the blocking tool 46 in a displacement direction D from the blocking position X into the release position R when the configuration tool 8 is in the configuration position with respect to the gripper 2, as shown in FIG. 7B.

The steps of configuring the gripper 2 for engaging and retaining a particular tire component 9 are described in more detail hereafter with reference to FIGS. 7A and 7B and FIGS. 8A and 8B.

During the steps of the configuration, as shown in FIGS. 7A and 7B, the configuration tool 8 is held stationary in the configuration position, while the gripper 2, including the gripping element 3, is moved and/or positioned by the manipulator 6 into the configuration position at or near the configuration tool 8. Alternatively, the configuration tool 8 may be moved towards the gripper 2, in which case the gripper 2 is held stationary in the configuration position during the configuration. In said configuration position, as shown in FIG. 7A, the fingers 82 of the configuration tool 8 are aligned in the engagement direction E with respect to the gripper 2 so as to mesh between the operational members 43. Subsequently, the manipulator 6 moves the displacement member 83 into abutment with the abutment member 49 in the engagement direction E. After the initial abutment the manipulator 6 moves the gripper 2 further in the engagement direction E so that the displacement member 83 actually displaces the blocking tool 46 via the abutment member 49 from the blocking position X into the release position R, as shown in FIG. 7B. Now the knobs 45 of the operational members 43 are no longer blocked by the blocking tool 46 and the operational members 43 can be freely moved by the configuration tool 8 in the push direction P and the pull direction Q.

Prior to or as a first step of the configuration, all operational members 43 are moved into the same position, either the pulled up position F or the pushed down position G. This preparatory step is substantially the same as the steps of the actual configuration. Reference is therefore made to the description of the configuration steps below.

With the movement of the gripper 2 in the engagement direction E, the configuration members 81 are brought in a position either above the knobs 45 of the operational members 43 that are in the pulled up position F or below the knobs 45 of the operational members 43 that are in the pushed down position G. When extending underneath the knobs 45, the fingers 82 are arranged to mesh with and/or extend between the stems 44 of the operational members 43. The fingers 82 are spaced apart to allow accommodation of the stems 44 between the fingers 82, while being sufficiently close to each other for abutting the knob 45 in the pull direction Q. The fingers 82 furthermore extend in the engagement direction beyond the first row up to and alongside the stems 43 of the operational members 43 in the second row. With the configuration members 81 in a position for interacting with the operational members 43, the manipulator 6 moves the gripper 2 relative to the configuration tool 8 in the push direction P or the pull direction Q so that the engaged operational members 43 are moved by the stationary configuration tool 8 in either the pull direction Q or the push direction P, respectively.

The number of operational members 43 which are engaged and moved by the configuration tool 8 defines the number of sections 34 of the gripping element 3 which are activated to form the suction area 36, which can be the full activatable area 35 in the full mode or only a part of the activatable area 35 in the partial mode. The number of operational members 43 which are engaged by the configuration tool 8 can be adjusted by moving the gripper 2 along or parallel to the index direction I into an index position in accordance with the number of operational members 43 that are to be engaged. The gripper 2 is positionable with respect to the configuration tool 8 in a plurality of index positions which are spaced apart over the same or constant interval as the configuration members 81 and the operational members 43. For each index position along the index direction I, the configuration members 81 of the configuration tool 8 are arranged to interact or to mesh with, interact with or engage a different number of the operational members 43. The farther an index position is offset with respect to the center of the gripper 2, the less operational members 43 are engaged. Because the interval between the configuration members 81 and the operational members 43 is the same, the configuration members 81 will always engage a compact, serried or closed group of directly adjacent operational members 43, such that a compact, serried or closed group or chain of directly adjacent sections 34 is activated. In the example of FIG. 8B, the gripper 2 is offset with respect to the configuration tool 8 along the index direction I into an index position in which the last four operational members 43 are not engaged by the configuration tool 8 and thus remain in the their initial position. The operational members 43 that are engaged are moved simultaneously by the configuration tool 8 into either the pulled up position F or the pushed down position G to open or close, respectively, the corresponding valves 41 (as shown in FIG. 5).

Figure 8A:
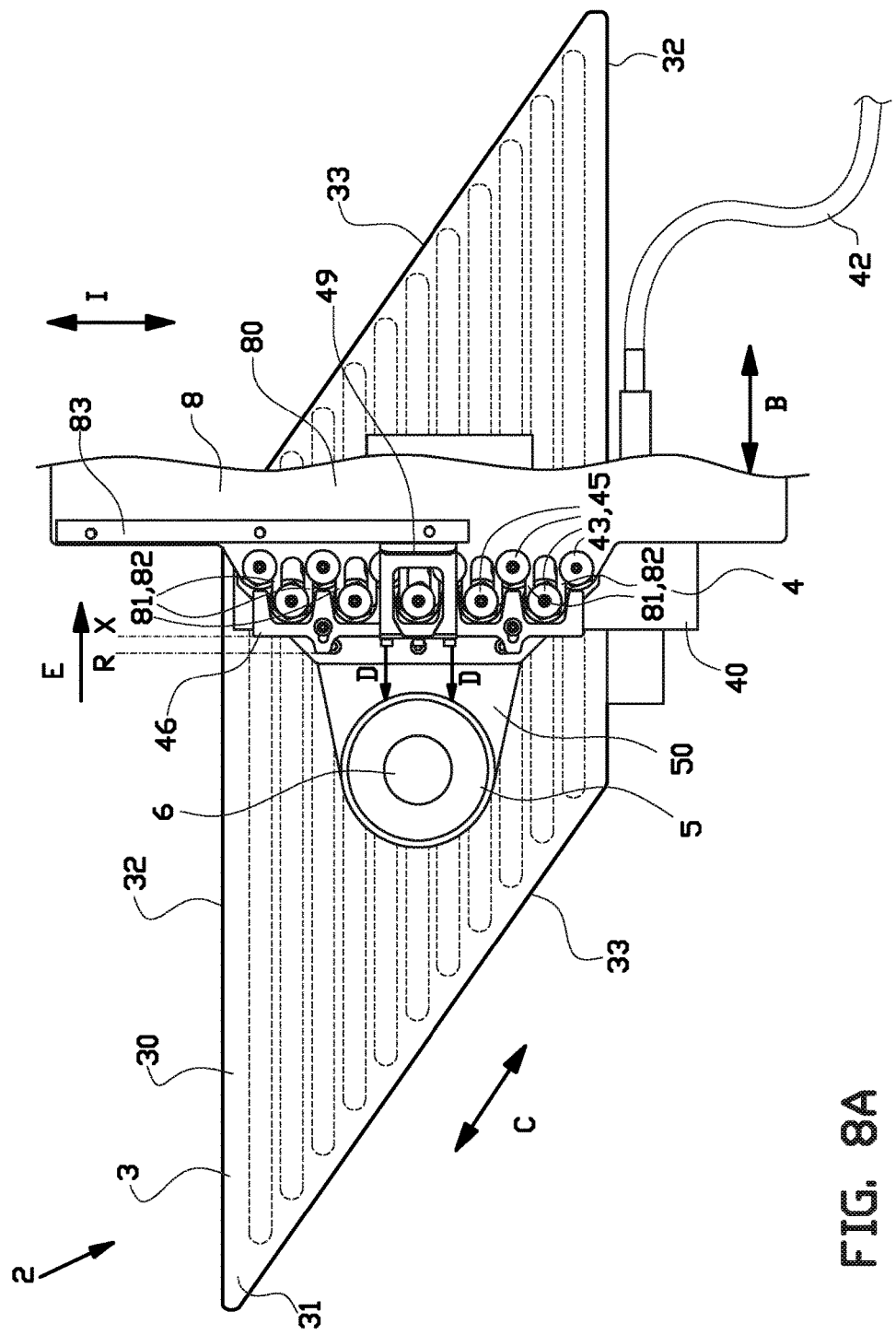
FIGS. 8A and 8B show top views of the gripper interacting with the configuration tool in two different configurations.
Figure 8B:
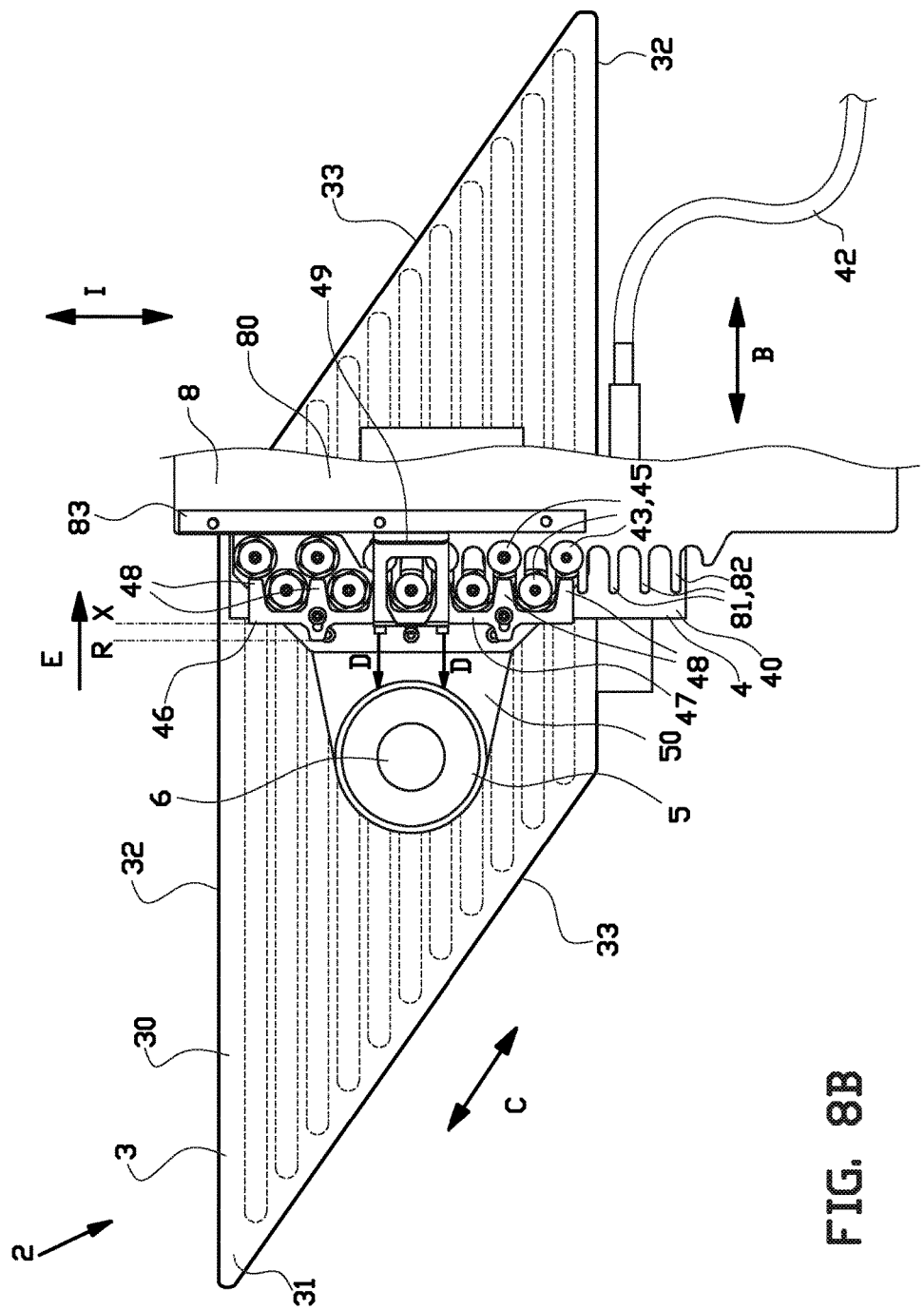

As shown in FIGS. 8A and 8B, the displacement member 83 is sufficiently long in the index direction I to abut the abutment member 49 in at least half of the index positions along the index direction I.

Thus, by selectively engaging a number of the operational members 43 with the configuration tool 8, the suction area 36 can be adjusted to substantially match or correspond to the surface area 91 of the tire component 9, for securely engaging and retaining the tire component 9 at the gripping face 31. In particular, the width of the suction area 36 in the second direction C can be adjusted to match the width of the tire component 9 in said direction. The length of subsequently handled tire components 9 may vary, for example when building breaker plies out of alternatingly shorter and longer tire components 9.

Retaining and release of the tire component is effectuated by the main valve (not shown) in vacuum supply that is connected to the vacuum block 4. To further promote release the tire component 9 from the gripping element 3, said gripping element 3 may additionally be provided with a plurality of release channels or release holes in between the suction holes 38 of the respective sections 34, through which pressure may be applied to the tire component 9 to detach the tire component 9 from the gripping face 31.

In a preferred embodiment of the invention, as shown in FIG. 5, the first section 41 downstream of the vacuum supply is always kept open and is equipped with a pressure sensor 501, downstream of the vacuum source. When a tire component 9 is fully engaged, this sensor 501 will detect a partial vacuum that is close to or matching the value of the partial vacuum of the vacuum source. Incomplete engagement and/or partial presence of a tire component 9 is therefore detected, when the value of the partial vacuum measured by the sensor 501 does not match the value of the partial vacuum of the vacuum source.

The alternative gripping elements 103, 203, 303, 403 are held ready for use in the magazine 5, within the range of the manipulator 6. The alternative gripping elements 103, 203, 303, 403 are functionally similar, equivalent or identical to the gripping element 3 and only differ from the gripping element 3 in the length of the pairs of parallel sides and/or the oblique angle of the directly adjacent sides. Thus, alternative tire components (not shown) which are cut at different lengths, widths and/or at different cutting angles, can be reliably gripped by a suitably shaped or dimensioned one of the alternative gripping elements 103, 203, 303, 403. Typically, a tire manufacturer only has a limited range of tire components, thus, requiring only a limited amount of alternative gripping elements 103, 203, 303, 403.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

For example, multiple gripper assemblies as the gripper assembly 1 as shown in FIG. 1 may be used to transfer tire components 9 to different production lines, e.g. for the production of breaker plies with different sizes or shapes. In such a situation, the configuration tools 8 of both gripper assemblies 1 may be integrated into one configuration tool (not shown), which is placed within range of both manipulators 6 to simultaneously or alternatingly configure the grippers 2 of each of the gripper assemblies 1.

In summary the invention relates to a gripper assembly and a method for gripping a tire component, wherein the gripper assembly is provided with a gripper comprising a gripping element with a gripping face to engage and retain the tire component through suction, wherein the gripping face comprises a plurality of sections, wherein the gripper for each section comprises a vacuum channel and a valve that is placed between the vacuum channel of the respective section and a vacuum source, wherein each valve is individually operable to an open position and a closed position, wherein the gripping face in use has a suction area formed by the sections of which the respective valves are in the open position, wherein the suction area is adjustable by selectively operating the plurality of valves to the open positions and the closed positions wherein the gripper assembly further comprises a configuration tool which in a configuration position is arranged to control the respective valves to their open positions and their closed positions.

The invention claimed is:

1. A gripper assembly for gripping a tire component, wherein the gripper assembly is provided with a gripper comprising a gripping element with a gripping face that is arranged to engage and retain the tire component through suction, wherein the gripping face comprises a plurality of sections, wherein the gripper for each section comprises a vacuum channel that debouches at the respective section in the gripping face for retaining the tire component to the respective section and a valve that is placed between the vacuum channel of the respective section and a vacuum source, wherein each valve is individually operable to an open position in which the valve is arranged to connect the vacuum channel of the respective section in fluid communication to the vacuum source and a closed position in which the valve is arranged to disconnect the vacuum channel of the respective section from the vacuum source, wherein the gripping face in use has a suction area formed by the sections of which the respective valves are in the open position, wherein the suction area is adjustable by selectively operating the plurality of valves to the open positions and the closed positions, wherein the gripper assembly further comprises a configuration tool, wherein the gripper and the configuration tool are positionable with respect to each other in a configuration position for operating the valves, wherein the gripper for each valve is provided with an operational member that is operationally connected to the respective valve to operate the respective valve to the open position and the closed position, wherein the configuration tool is provided with a plurality of configuration members which in the configuration position are arranged to interact with the operational members to control the respective valves to their open positions and their closed positions.

2. The gripper assembly according to claim 1, wherein each operational member is movable in a push direction and a pull direction opposite to the push direction to operate the respective valve to the open position and the closed position, wherein the configuration members are arranged to push and pull the operational members to control the respective valves to their open positions and their closed positions.

3. The gripper assembly according to claim 2, wherein each operational member comprises a stem that is operationally connected to the valve in the push direction and a knob that is fixedly attached to the stem in the pull direction, wherein the configuration members are fingers which are arranged to mesh with, interact with or engage the knobs of the operational members for moving said operational members in the push direction or the pull direction.

4. The gripper assembly according to claim 1, wherein the operational members are spaced apart in or parallel to an index direction over a constant interval, wherein the configuration members are spaced apart over the same constant interval.

5. The gripper assembly according to claim 4, wherein one of the gripper and the configuration tool is positionable with respect to the other of the gripper and the configuration tool in various index positions along the index direction, wherein the index positions are spaced apart at the same constant interval as the operational members and the configuration members, wherein the configuration members are arranged to mesh with, interact with or engage a different amount of the operational members for each index position along the index direction.

6. The gripper assembly according to claim 4, wherein the configuration members, when meshing with, interacting with or engaging two or more of the operational members, are arranged for meshing with, interacting with or engaging a closed group of two or more adjacent operational members in or parallel to the index direction.

7. The gripper assembly according to claim 1, wherein the gripper assembly further comprises a manipulator that is coupled to the gripper for positioning the gripper with respect to the tire component.

8. The gripper assembly according to claim 1, wherein the gripper comprises a valve block that is mounted to the gripping element and that holds the valves in fluid communication with the vacuum channels, wherein the gripper assembly comprises at least one alternative gripping element for engaging and retaining an alternative tire component of a different size and/or shape through suction, wherein the valve block is detachable from the gripping element and mountable to the at least one alternative gripping element.

9. The gripper assembly according to claim 8, wherein the gripper assembly further comprises a manipulator that is coupled to the gripper for positioning the gripper with respect to the tire component, wherein the gripper is provided with a coupling element that is fixedly attached to the valve block, wherein the manipulator is arranged to engage the gripper at the coupling element.

10. The gripper assembly according to claim 7, wherein the configuration tool is arranged to be stationary, wherein the manipulator is arranged for moving the gripper into proximity of the stationary configuration tool, such that the configuration tool is in the configuration position with respect to the gripper, wherein the manipulator is further arranged for moving the gripper with respect to the stationary configuration tool such that the configuration members interact with the operational members to control the respective valves to their open positions and their closed positions.

11. The gripper assembly according to claim 2, wherein the gripper assembly further comprises a blocking tool that is movable with respect to the operational members between a release position and a blocking position for allowing or blocking, respectively, movement of the operational members in the push direction and the pull direction.

12. The gripper assembly according to claim 11, wherein the operational members are movable in the push direction and the pull direction between a pushed down position and a pulled up position, respectively, which are spaced apart by an intermediate space, wherein the blocking tool comprises a plurality of blocking members which in the blocking position extend into the intermediate space between the respective pushed down positions and the respective pulled positions to block movement in the pull direction of any of the operational members which are in the pushed down position and to block movement in the push direction of any of the operational members which are in the pulled up position.

13. The gripper assembly according to claim 11, wherein the configuration tool is provided with a displacement member that is arranged to displace the blocking tool from the blocking position into the release position when the configuration tool is in the configuration position with respect to the gripper.

14. The gripper according to claim 13, wherein the blocking tool is provided with an abutment member, wherein the displacement member is arranged to abut the blocking tool at the abutment member to displace the blocking tool through abutment.

15. The gripper assembly according to claim 13, wherein the gripper is provided with a biasing element for biasing the blocking tool into the blocking position, wherein the displacement member is arranged for displacing the blocking tool against the bias into the release position.

16. The gripper assembly according to claim 11, wherein the blocking tool is provided on the gripper and is movable with respect to the operational members between the release position and the blocking position.

17. The gripper assembly according to claim 16, further comprising a proximity sensor for detecting the return of the blocking tool from the release position to the blocking position.

18. The gripper assembly according to claim 1, wherein one of the sections is provided with a pressure sensor for detecting the pressure in said section.

19. The gripper according to claim 1, wherein the sections form an activatable area of the gripping face, wherein the suction area is adjustable to a full mode in which the suction area extends across the entire activatable area and a partial mode in which the suction area extends across only a part of the activatable area.

20. The gripper according to claim 19, wherein each section is directly adjacent to another one of the sections so as to allow the formation of the suction area from a single chain of adjacent sections.

21. The gripper according to claim 1, wherein the suction area is adjustable to match the surface area of the tire component to be gripped.

22. The gripper according to claim 1, wherein the tire component has a parallelogram or rhomboid contour with two pairs of parallel sides, wherein the gripping face has a parallelogram or rhomboid contour with two pairs of parallel sides for retaining the tire component on the gripping face with each pair of parallel sides of the tire component extending parallel to one of the pairs of the parallel sides of the gripping face.

23. The gripper according to claim 22, wherein the sections extend in a first direction parallel to one of the pairs of parallel sides of the gripping face.

24. The gripper according to claim 23, wherein the sections are adjacent to each other in a second direction parallel to the other of the pairs of parallel sides of the gripping face.

25. The gripper according to claim 22, wherein the sections cover the entire gripping face in the first direction.

26. The gripper according to claim 22, wherein the sections cover the entire gripping face in the second direction.

27. A method for gripping a tire component with a gripper assembly according to claim 1, wherein the method comprises the step of adjusting the suction area by selectively operating the plurality of valves to the open positions and the closed positions.

28. The method according to claim 27, wherein the sections form an activatable area of the gripping face, wherein the method comprises the step of adjusting the suction area to a full mode in which the suction area extends across the entire activatable area and a partial mode in which the suction area only extends across only a part of the activatable area.

29. The method according to claim 27, wherein the suction area is formed by a single chain of adjacent sections.

30. The method according to claim 27, wherein the suction area is adjusted to match the surface area of the tire component to be gripped.

31. The method according to claim 27, wherein the step of adjusting the suction area to a specific configuration comprises the configuration steps of simultaneously operating all of the valves to the open position or the closed position and subsequently simultaneously operating a selection of the valves to the open position or the closed position in accordance with the specific configuration of the suction area.

32. The method according to claim 27, wherein the valve for at least one of the sections is kept open to detect the presence or partial presence of a tire component at said one section through measuring the pressure in said one section.

33. The method according to claim 27, wherein the gripper comprises a valve block that is mounted to the gripping element and that holds the valves in fluid communication with the vacuum channels, wherein the gripper assembly comprises at least one alternative gripping element for engaging and retaining an alternative tire component of a different size and/or shape through suction, wherein the method comprises the step of detaching the valve block from the gripping element and mounting the valve block to the at least one alternative gripping element.

* * * * *